United States Patent Office 2,813,889
Patented Nov. 19, 1957

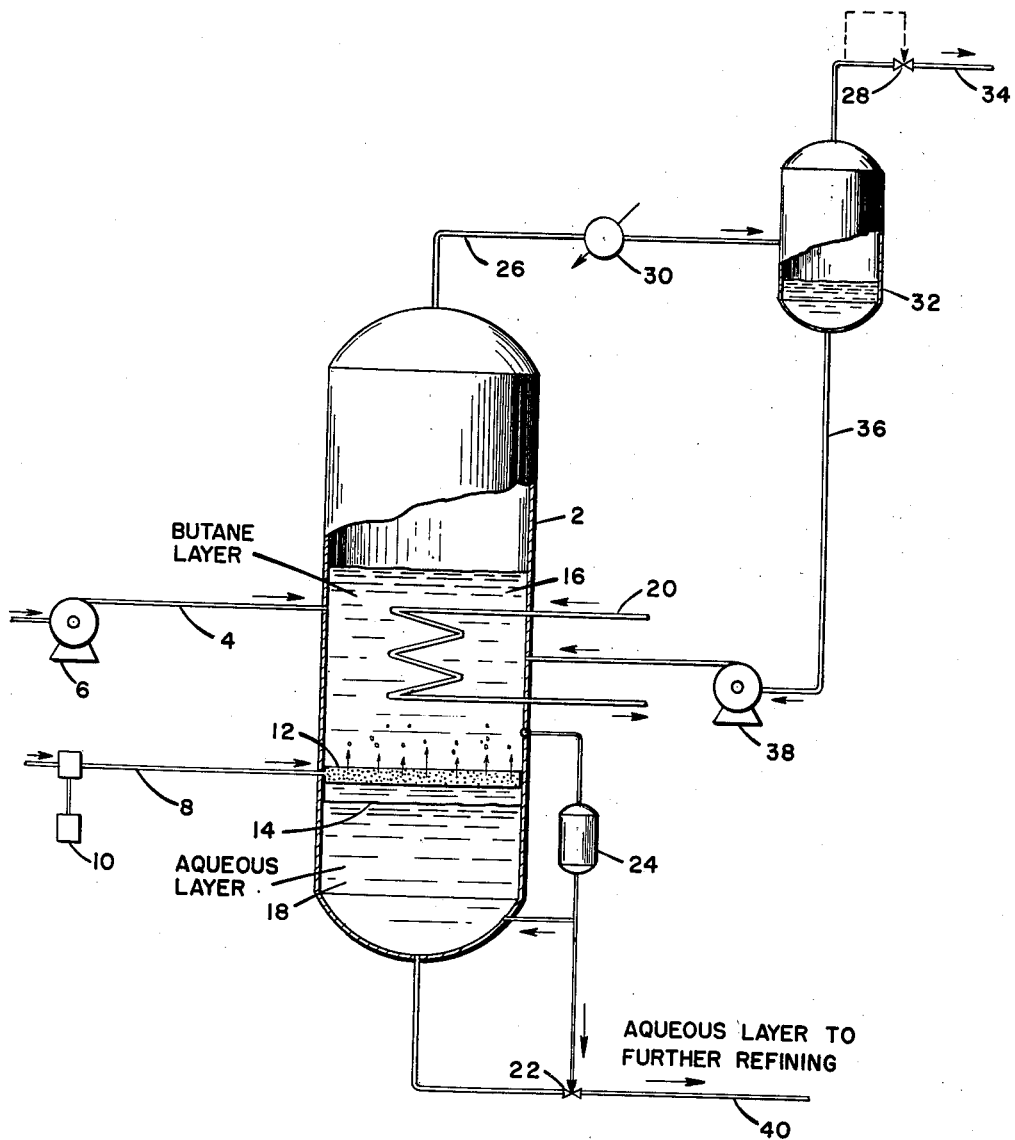

2,813,889
PROCESS FOR PARTIAL OXIDATION OF HYDROCARBONS IN THE LIQUID PHASE

Frank G. Pearce, Tulsa, Okla., assignor to Pan American Petroleum Corporation, a corporation of Delaware Application August 31, 1955, Serial No. 531,687

4 Claims. (Cl. 260—451)

The present invention relates to the partial oxidation of hydrocarbons. More particularly, it relates to a novel method for conducting such an oxidation process while maintaining the hydrocarbon in the liquid phase. While the process of my invention is applicable to hydrocarbons in general which can be maintained in the liquid phase under reaction conditions, it is particularly applicable to liquefied petroleum gases, i. e., propane, butane, and pentane.

Various procedures for the liquid phase partial oxidation of hydrocarbons such as, for example, propane, butane, hexane, and the like have previously been proposed. In carrying out this oxidation in accordance with prior methods, the hydrocarbon is placed in a suitable pressure vessel, and air or oxygen is introduced at temperatures ranging from about 265° to about 430° F. The products of the reaction consist chiefly of acids, ketones, aldehydes, and esters. Under the conditions of temperature and pressure employed, oxygen is introduced at a controlled rate such that it is substantially completely consumed, and, as the reaction proceeds, products comprising oxygenated chemicals, water, unreacted hydrocarbons, and various inert gases are taken overhead. The resulting products are condensed and allowed to separate into two liquid phases consisting of an upper organic layer comprising unreacted hydrocarbon and the lower aqueous phase containing water of reaction plus chemicals. Where butane is the hydrocarbon being oxidized, typical analyses of this aqueous layer indicate the distribution of chemicals to be as follows: 55 percent acids, of which acetic acid represents about 90 percent; 22 percent alcohols, of which about 30 percent is methanol, 50 percent ethanol, and about 15 percent isopropyl alcohol. Carbonyls comprise about 15 percent of the product mixture, with formaldehyde amounting usually to less than 1 percent. Esters make up the remainder of the mixture, generally amounting to about 8 or 10 percent.

A typical prior liquid phase technique in the partial oxidation of hydrocarbons is taught in U. S. 2,653,962, in which butane, for example, is oxidized with air under conditions such that all products of reaction together with unconverted butane are taken overhead and thereafter condensed and separated into hydrocarbon and aqueous layers. The hydrocarbon phase, principally butane, is recycled to the reactor to give a recycle-to-fresh-feed-butane ratio of approximately 70 to 1. This high recycle ratio presumably is required to maintain a low air-to-butane ratio in the reactor and also to remove the heat of reaction by means of vaporization. Inasmuch as it is indicated in this reference that the temperature employed may be as much as 25° to 30° F. above the critical temperature of the hydrocarbon or hydrocarbons being oxidized, a single liquid phase comprising chiefly reaction products (chemicals and water) probably exists in the reactor. The presence of a single liquid phase under the reaction conditions employed is further substantiated by the fact that the reactor is initially charged with glacial acetic acid which serves as a solvent for the butane and the reaction products.

With procedures such as those discussed above, the reaction vessel must be periodically opened up and the sludge of heavy reaction products removed therefrom. Also, a large amount of hydrocarbon must be present in the system at all times in order to accomplish the desired cooling effect in the reaction zone. In order to handle such relatively large quantities of hydrocarbon, appreciable pump capacity must be available.

Accordingly, it is an object of my invention to provide a method for the partial oxidation of hydrocarbons in the liquid phase wherein the products of reaction are removed from the lower portion of the oxidation zone substantially as rapidly as they are formed. It is a further object of my invention to provide a method for the partial oxidation of hydrocarbons in the liquid phase whereby the heat of reaction is removed by indirect heat exchange with a coolant of appreciable temperature differential so that the required cooling is accomplished by the use of a relatively small cooling surface. It is a still further object of my invention to avoid accumulation of heavy reaction products in the bottom of the reaction vessel by means of a periodic or continuous purge of products from the base of said vessel. It is another object of my invention to provide a method for the partial oxidation of hydrocarbons in the liquid phase whereby the explosion hazard is reduced to a minimum by maintaining a relatively large supply of hydrocarbon in the reaction vessel while holding to a minimum the escape of the hydrocarbon from the vessel in the form of vapor.

The foregoing disadvantages may be avoided and the above-mentioned objects accomplished as a result of my discovery that within certain ranges of operating conditions employed in the liquid phase partial oxidation of hydrocarbons, two liquid phases, a liquid organic or hydrocarbon phase and an aqueous liquid phase, exist, thereby rendering possible procurement of the advantages afforded by my invention.

In carrying out my invention in accordance with a preferred embodiment thereof, the hydrocarbon is charged to a suitable pressure vessel having a cooling coil or coils installed therein. Alternatively, for heat removal, provision may be made for withdrawing a stream of liquid hydrocarbon from the reactor, cooling it to the desired level, and returning it to the reaction zone. For the purpose of this description and of interpreting the present claims, the expression "direct heat exchange" will be used to signify either or both types of cooling. Oxygen or air is introduced near the base of the reactor and allowed to bubble through the hydrocarbon. The flow of oxygen to the reaction zone is at a predetermined rate while the introduction of hydrocarbon into the system may be regulated by means of a suitable liquid level control. For optimum efficiency, the oxygen flow should be such that effluent contains a small percentage thereof, e. g., about 0.1 to 0.5 percent.

The organic or hydrocarbon layer is held in the liquid phase by operating below the critical temperature thereof. Actually, such temperature may be from about 15° to about 20° F. above the critical temperature of the pure hydrocarbon or mixture of pure hydrocarbons, owing to the presence of dissolved product chemicals therein. In this connection, it is to be understood that the expression "slightly above the critical temperature," when referring to a specific hydrocarbon or a mixture of hydrocarbons, is intended to imply a range up to about 15° or 20° F. above the critical temperature of the hydrocarbon or hydrocarbons involved. Under such conditions of temperature and pressures of the order of from about atmospheric to about 1500 p. s. i., two liquid phases—a hydrocarbon or organic phase and a lower aqueous phase—can be maintained, with the lower pressures being employed for the higher molecular weight hydrocarbons. In the case of butane, temperatures of from about 265° to about 340° F. may be used at pressures of from about 450 to about 1000 p. s. i. Under these conditions, the products can be periodically or continuously removed from the base of the reactor as a portion of the aqueous layer. A small quantity of the product leaves the reactor as vapor. The amount of product removed in this manner is a function of the quantity of vapor going overhead. Accordingly, it is desirable to keep the amount of overhead vapors at as low a level as possible. The quantity of inerts leaving the reactor as vapor can be reduced by using relatively pure oxygen instead of air, and the volume of hydrocarbons passing overhead as vapor can be held to a minimum by extracting heat from the reaction zone in the manner mentioned above, thereby maintaining a low reaction temperature. In carrying out the process of my invention, the oxygen or air is preferably introduced into the reactor at a level slightly above the hydrocarbon-water layer interface. In this manner further oxidation of the product chemicals in the water layer is avoided.

For a better understanding of the process of my invention, reference is made to the accompanying drawing, where, in this particular instance, butane is fed into reaction vessel 2 through line 4 by means of pump 6. Air or oxygen is metered into vessel 2 through line 8 by means of pump 10. Mixing of the air or oxygen with liquid butane is facilitated by forcing it through a suitable sparger or distributor 12 located just above the interface 14 formed by upper butane layer 16 and lower aqueous layer 18. The temperature of the reaction zone is maintained at the desired level by means of cooling coil 20 through which water at about 80° to 120° F. is circulated. The level of interface 14 is kept substantially constant by means of a liquid level control device comprising a density responsive valve 22 and receiver 24 into which a portion of the lower aqueous layer 18 is conducted. Continuous flow of the lower product water layer prevents further conversion of the oxygenated products and removes from the system higher molecular weight materials which can accumulate in objectionable concentration if operations are carried out in the conventional way. Vapors are taken off overhead through line 26, cooled in condenser 30 and the resulting condensate collected in receiver 32. Uncondensed gases pass out of receiver 32 and the system through pressure relief valve 28 and line 34. The liquid in receiver 32 consists chiefly of butane and is returned to vessel 2 through line 36 by means of pump 38. Product water layer 18 which contains from about 50 to about 65 percent chemicals is taken from the lower portion of vessel 2 via line 40 and sent to further refining.

The process of my invention will be further illustrated by the following specific example.

*Example*

Butane preheated to about 285° F. was fed at the rate of about 2 mols per hour to a reaction zone maintained at a temperature of about 285° F. and at a pressure of about 550 p. s. i. The butane inlet was 0.75 inch from the bottom of the reaction zone. Prior to the entry of butane into the reaction zone a solution of catalyst consisting of 2.7 weight percent cobalt tetracetate, 77.0 weight percent acetic acid, and 20.3 weight percent water was added to and mixed with the butane stream at a rate of about 11.1 grams per hour. At a point 0.44 inch above the base of the reaction zone, oxygen was fed at the rate of about 1.7 mols per hour. Reaction occurred immediately on contact of the butane with oxygen which was introduced through a suitable distributing device located slightly above the interface of the product water layer and the butane. As the reaction proceeded, some unconverted gaseous butane, together with a minor amount of chemicals, was taken overhead and condensed at a temperature of from about 75° to 95° F., after which the resulting condensate flowed into a suitable receiver. The butane condensate contained a small amount of oxidation products which were removed therefrom by water washing. Thereafter the butane was recycled back to the feed line at the rate of about 1.6 mols per hour. During the reaction, water at a temperature of about 100° F. was circulated through a cooling coil immersed in the butane layer being subjected to oxidation.

Under the above-indicated conditions of operations, liquid products, including water, were collected at the rate of about 58 grams per hour. Of this liquid product fraction about 20 weight percent was water. The distribution of chemicals by classes was as follows:

| | Mol percent |
|---|---|
| Acids | 68 |
| Alcohols | 10 |
| Carbonyls | 14 |
| Esters | 8 |

The oxygen conversion under the above conditions was about 95 percent and the selectivity of oxygen to chemicals was about 65 percent. On a carbon basis the selectivity of butane to chemicals in the process of my invention was about 95 percent.

Fom the foregoing decription it will be apparent that the process of my invention takes advantage of a phenomenon that has heretofore gone unrecognized in the art of liquid phase partial oxidation of hydrocarbons. Such beneficial effects can be obtained so long as the pressure and temperature within the reactor are such as to cause two liquid phases to be present. It will be likewise apparent that the process of my invention may be modified in numerous ways without departing from the intended scope thereof. For example, product distribution may be controlled by washing with water the butane fraction cooled for temperature control prior to injection of said fraction into the reaction zone. Product distribution might also be changed by recirculating a portion of the lower aqueous layer to the upper butane phase.

I claim:

1. A method for conducting the partial oxidation of butane by contacting the latter in the liquid phase with a gas containing free oxygen in a reaction zone comprising effecting the reaction under conditions of temperature and pressure such that separate liquid butane and liquid water layers are produced and maintained in said zone during said partial oxidation, injecting said gas into said zone at a level slightly above the interface of said layers, said temperature being maintained by cooling said zone through heat exchange and removing a portion of said water layer as it is formed from the base of said zone.

2. The process of claim 1 in which the temperature ranges from about 265° to about 340° F. and the pressure used varies from about 450 to 1000 p. s. i.

3. The process of claim 2 in which the temperature in said zone is maintained by withdrawing a stream of butane from the layer thereof in said zone, cooling said butane to a temperature of from about 80° to about 120° F., and returning the latter directly to said layer.

4. A method for conducting the partial oxidation of butane by contacting the latter in the liquid phase with a gas containing free oxygen in a reaction zone comprising effecting the reaction at a temperature up to not more than about 20° F. above the critical temperature of butane and at a pressure such that separate liquid butane and liquid water layers are produced and maintained in said zone during said partial oxidation, injecting said gas into said zone at a level slightly above the interface of said layers, said temeperature being maintained by cooling said zone through heat exchange and removing a portion of said water layer as it is formed from the base of said zone.

References Cited in the file of this patent

UNITED STATES PATENTS

| | | |
|---|---|---|
| 1,770,875 | Burwell | July 15, 1930 |
| 1,976,790 | Lewis et al. | Oct. 16, 1934 |
| 2,009,663 | James | July 30, 1935 |
| 2,391,236 | Hirsch | Dec. 18, 1945 |
| 2,557,281 | Hamblet et al. | June 19, 1951 |
| 2,704,294 | Morgan et al. | Mar. 15, 1955 |
| 2,734,067 | Chapman et al. | Feb. 7, 1956 |